United States Patent
Khan et al.

(10) Patent No.: US 6,369,987 B1
(45) Date of Patent: *Apr. 9, 2002

(54) SUSPENSION MANUFACTURING METHOD AND PRODUCT

(75) Inventors: Amanullah Khan; Warren Coon, both of Temecula, CA (US)

(73) Assignee: Magnecomp Corp., Temecula, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/714,245

(22) Filed: Nov. 15, 2000

Related U.S. Application Data

(63) Continuation of application No. 09/215,416, filed on Dec. 18, 1998, now Pat. No. 6,154,343.

(51) Int. Cl.$^7$ .............................................. G11B 5/48
(52) U.S. Cl. ........................ 360/245.9; 360/245.2; 29/603.03
(58) Field of Search ..................... 360/244.2, 244.8, 360/244.9, 245.2, 245.8, 245.9; 156/257, 510, 513, 514; 29/603.03, DIG. 1

(56) References Cited

U.S. PATENT DOCUMENTS

| | | | | |
|---|---|---|---|---|
| 4,819,094 A | * | 4/1989 | Oberg ..................... | 360/245.9 |
| 5,442,504 A | * | 8/1995 | Nagase et al. ........... | 360/245.4 |
| 5,491,597 A | * | 2/1996 | Bennin et al. ........... | 360/245.9 |
| 5,598,307 A | * | 1/1997 | Bennin ..................... | 360/245.9 |
| 5,805,381 A | * | 9/1998 | Resh ........................ | 360/245.5 |
| 5,808,836 A | * | 9/1998 | Frater et al. .............. | 360/244.9 |
| 5,812,344 A | * | 9/1998 | Balakrishnan ........... | 360/245.9 |
| 5,859,749 A | * | 1/1999 | Zarouri et al. ........... | 360/245.9 |
| 5,883,758 A | * | 3/1999 | Bennin et al. ........... | 360/245.9 |
| 5,883,759 A | * | 3/1999 | Schulz ..................... | 360/245.9 |
| 6,154,343 A | * | 11/2000 | Khan et al. .............. | 360/245.9 |
| 6,201,667 B1 | * | 3/2001 | Yamamoto et al. ...... | 360/245.9 |

* cited by examiner

*Primary Examiner*—David L. Ometz
(74) *Attorney, Agent, or Firm*—Louis J. Bachand

(57) ABSTRACT

A flexible conductor is mounted to a suspension comprising a flexure and a load beam using a flowable adhesive-passing channel at a locus of flexible conductor attachment to the suspension and a flowable adhesive forced into the channel in a manner forming a crown of the adhesive over and around the channel inlet, and hardening the adhesive in bonding relation with the flexible conductor and the suspension, the adhesive crown mechanically locking the suspension load beam, flexure and flexible conductor in their desired alignment.

12 Claims, 2 Drawing Sheets

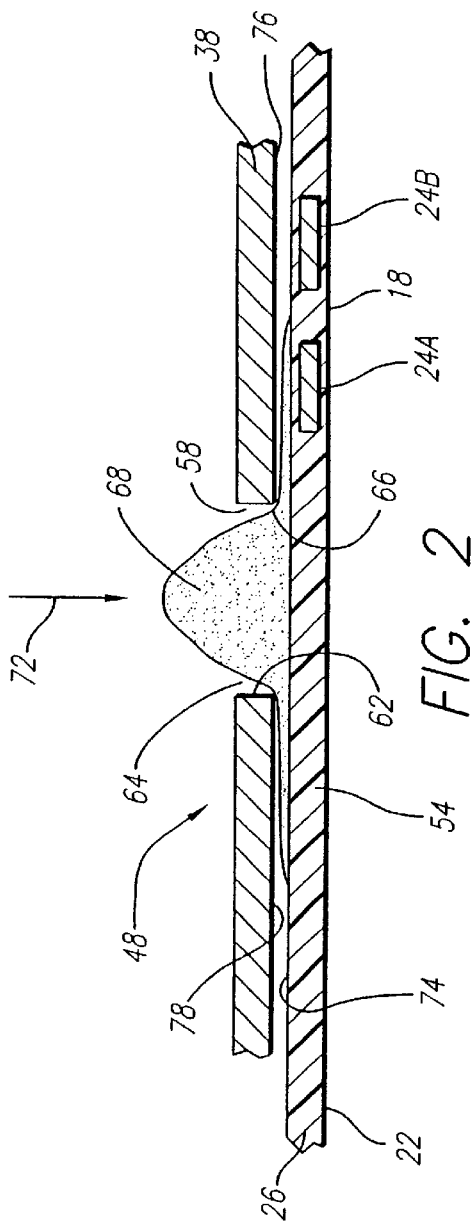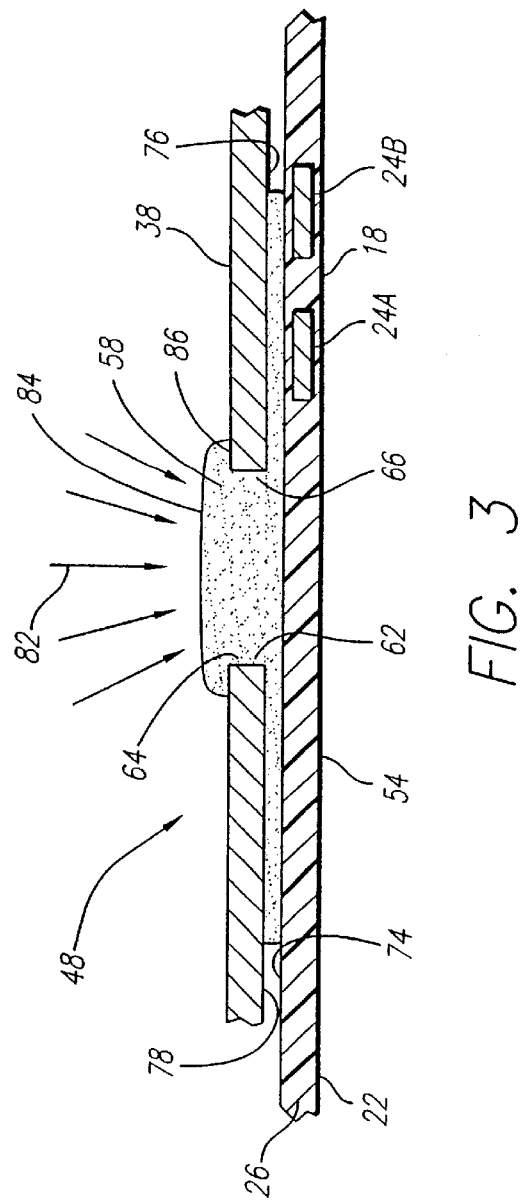

SUSPENSION MANUFACTURING METHOD AND PRODUCT

REFERENCE TO RELATED APPLICATIONS

This application is a continuation of U.S. patent application Ser. No. 09/215,416, filed Dec. 18, 1998 now U.S. Pat. No. 6,154,343.

BACKGROUND OF THE INVENTION

1. Field of the Invention

This invention relates to disk drive suspensions, and more particularly to improvements in the manufacture of disk drive suspensions having flexible conductors attached to the load beam and flexure portions of the suspension. In a specific aspect, the invention provides for the adhesive attachment mounting of flexible conductors comprising a laminate of two or more conductors and flexible plastic film to a suspension load beam and/or flexure from the back, or non-slider, side of the load beam and flexure with fewer process step, less handling of the small parts, and reduced opportunity for manufacturing error.

2. Related Art

Flexible conductors are used in disk drive suspensions in lieu of wires to conduct electrical signals between the read/write head and the device electronics with the flexible conductors being adhesively bonded to the suspension load beam. See U.S. Pat. No. 5,491,597, for example. The attachment or mounting of the flexible conductors can be problematical with manufacturing difficulties being of paramount concern. Adhesives must be placed in precise locations and in concert and not conflict with other manufacturing steps. Typically, as in the above-referenced patent, the conductor is on the slider side of the suspension and must be bonded by application of the adhesive between the conductor and the suspension load beam, necessitating several steps involving manipulation of the conductor and load beam to get suitable access to the bonding areas, effective alignment of parts and curing of the adhesive. This has required approaching the assembly first from one side then the other, with consequent extra process steps such as double fixturing, both sides cure, and their increased risk of damage or error.

SUMMARY OF THE INVENTION

It is an object of the present invention to provide an improved method of mounting a flexible conductor to a suspension load beam, suitably from a single side of the load beam so as to reduce handling and opportunity for error while maintaining proficiency in attachment. It is a further object to provide mounting locations for the adhesive placed so as to be accessible from the back side, or non-slider side, through which adhesive is flowed and cured all from the same side. It is a further object to provide an assembly for bonding in which the aligned flexible conductor and load beam or flexure substrate has a port into which flowable adhesive is forced in sufficient quantities to overflow the port perimeter above and below the port forming, with cure a crown providing mechanical as well as adhesive locking of the aligned parts together.

These and other objects are realized in accordance with the invention in the single-side method of mounting a flexible conductor to a suspension comprising a flexure and a load beam, that includes forming in the suspension a flowable adhesive-passing channel at a locus of flexible conductor attachment to the suspension, the channel having an inlet and an outlet, engaging the flexible conductor and suspension in their desired alignment with the flexible conductor adjacent the channel outlet, forcing a flowable adhesive into the channel inlet, through the channel and between the aligned suspension and flexible conductor in a manner forming a crown of the adhesive over and around the channel inlet, hardening the adhesive in bonding relation with the flexible conductor and the suspension, the adhesive crown mechanically locking the suspension and flexible conductor in their the desired alignment, and the resulting product.

In this and like embodiments, typically, the method further includes forming a series of laterally and longitudinally distributed channels for registration with a plurality of attachment loci for the flexible conductor and the suspension, and where there is a flexure as well as a load beam in the suspension, further forming at least one the channel in the load beam, and forming at least two the channels in the flexure, e.g. on flexure left and right tabs projecting beyond the load beam, and there is included also forming one of the two flexure channels in each of the flexure tabs, the flexible conductor being fixed to the tabs and fixed to the load beam with the adhesive.

In a further embodiment, the invention provides the single-side method of mounting a flexible conductor to a suspension comprising a flexure and a load beam, including forming in the suspension a flowable adhesive-passing channel at a locus of flexible conductor attachment to the suspension, the channel having an inlet and an outlet, engaging the flexible conductor and suspension in their desired alignment with the flexible conductor adjacent the channel outlet, forcing a radiation curable, flowable adhesive into the channel inlet, through the channel and between the aligned suspension and flexible conductor in a manner forming a crown of the adhesive over and around the channel inlet, curing the adhesive by radiation exposure at the channel inlet, the adhesive curing in bonding relation with the flexible conductor and the suspension, the adhesive crown mechanically locking the suspension to the flexible conductor in their desired alignment.

In this and like embodiments, typically, the method also includes forming a series of laterally and longitudinally distributed channels for registration with a plurality of attachment loci for the flexible conductor and the suspension, and where the suspension comprises a load beam and a flexure, there is further included forming at least one the channel in the load beam, and forming at least two channels in the flexure, e.g. in suspension flexure left and right tabs projecting beyond the load beam, and including also forming one of the two flexure channels in each of the flexure tabs, the flexible conductor being fixed to the tabs and fixed to the load beam with the adhesive, exposing the adhesive to UV curing radiation to cure the adhesive, and the products made thereby.

The invention in a further embodiment further provides the single-side method of mounting a flexible conductor comprising a plurality of conductors and a flexible plastic layer to a suspension comprising a load beam and a separate flexure fastened to the load beam, the flexure having left and right tabs extending laterally beyond the load beam, that includes forming in the load beam at least one flowable adhesive-passing channel at a locus of flexible conductor attachment to the load beam, the channel having an inlet and an outlet, forming in each flexure tab a flowable adhesive-passing channel at a locus of flexible conductor attachment to the flexure, each channel having an inlet and an outlet, engaging the flexible conductor and suspension in their desired alignment with the flexible conductor adjacent the channel outlet, forcing radiation curable, flowable adhesive into each channel inlet, through each channel and between the aligned suspension and flexible conductor in a manner forming a crown of the adhesive over and around each the channel inlet, curing the adhesive by radiation exposure at each channel inlet, the adhesive curing in bonding relation with the flexible conductor and the suspension, the adhesive crowns mechanically locking the suspension to the flexible conductor in their the desired alignment at each locus of attachment.

In a product embodiment, the invention provides a fixed assembly of a suspension and flexible conductor, the suspension defining at a locus of attachment between the suspension and the flexible conductor a through-channel having an inlet and an outlet, a crowned mass of hardened adhesive in the channel, the adhesive extending from the channel outlet onto the flexible conductor in bonding relation and from the channel inlet to form the crown in mechanical locking relation of the suspension to the flexible conductor.

In this and like embodiments, the invention provides a suspension having a series of laterally and longitudinally distributed through-channels for registration with a plurality of attachment loci for the flexible conductor and the suspension, and where the suspension comprises a load beam and a flexure, there is at least one through-channel in the load beam, and the flexure has at least at least two through- channels, the suspension flexure has left and right tabs projecting beyond the load beam, one of the two flexure through-channels being located in each of the flexure tabs, the flexible conductor being fixed to the tabs and fixed to the load beam with the adhesive, and the adhesive is UV radiation cured.

BRIEF DESCRIPTION OF THE DRAWINGS

The invention will be further described in conjunction with the attached drawings in which:

FIG. 2 is a view in section of a typical alignment of flexible conductor and suspension at the port showing the bonding adhesive being added; and FIG. 3 is a view like FIG. 2 taken on line 3—3 in FIG. 1 showing the completed assembly with the hardened adhesive.

DETAILED DESCRIPTION OF THE PREFERRED EMBODIMENTS

Figure 1:
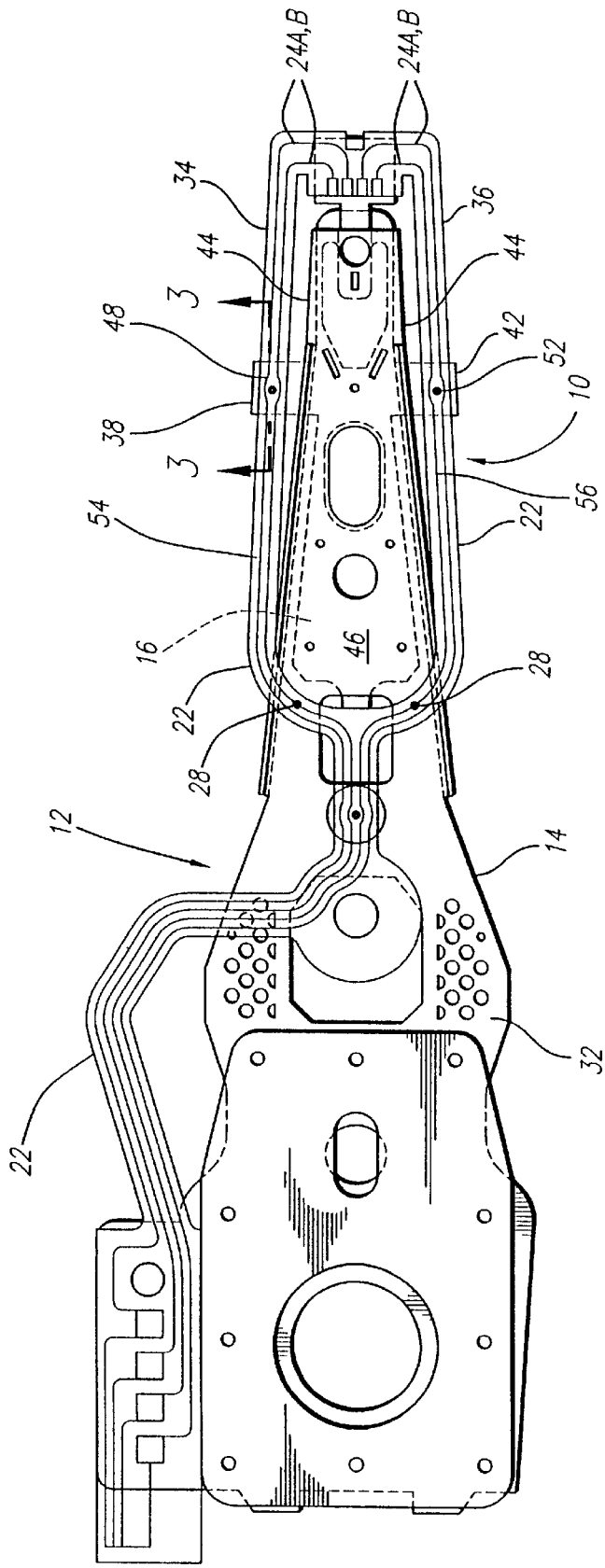
FIG. 1 is a plan view of the invention suspension with the attached flexible conductor.

In general in the invention, the parts to be bonded together, the suspension load beam/flexure and flexible conductor, are aligned in generally flat, parallel, face-to-face contact with their individual loci of attachment defined by through-channels in the load beam or the flexure in a position to be visible from the back-side of the suspension. Suitable, e.g. epoxy resin adhesive is injected through the channel as with a syringe or hypodermic needle to flow between the suspension/flexure and the flexible conductor. This injection forces the aligned parts to separate some and provides a space for a layer of adhesive between the parts. Additional adhesive mounds up spilling over the channel inlet forming a crowned head like a bolt or rivet head. UV radiation is used to cure the adhesive, from a single side since the entire mass of adhesive resin can be subjected to effective radiation from the single side in contrast to previous processes.

With reference now to FIGS. 1 and 3, the Figures depict a fixed assembly 10 of a suspension 12 comprising a load beam 14 and a separate but weld-attached flexure 16 on the front or slider side 18 of the suspension. Flexible conductor 22 comprising a plurality of conductors 24a, 24b embedded in plastic film 26 is bonded to the load beam 14 at each load beam attachment locus 28 forward of the spring section 32 of the load beam so that the load beam provides support structure for the flexible conductor. The flexible conductor 22 beyond each locus 28 has, respectively, left and right portions 34, 36. Flexure 16 is provided with left and right projecting tabs 38, 42 that project beyond the periphery 44 of the load beam so as to be visible from the back side or non-slider side 46 of the load beam 14. The tabs 38, 42 provide additional support structure for the flexible conductor 22. Accordingly, each of the tabs 38, 42 define an attachment or bonding locus 48, 52, respectively, the tabs being arranged to support the opposing portions 54, 56 of the flexible conductor 22.

With reference to FIGS. 1, 2 and 3, a typical alignment of the flexible conductor 22 and a supporting structure, e.g. tab 38 is shown. The tab 38 is typically formed of the same metal as the flexure 16 from which it projects. The tab 38 defines a through-channel 58, essentially a vertical bore 62, having an inlet 64 and an outlet 66. As described elsewhere herein, bonding adhesive deposit 68 is injected forcibly into the through-channel 58 by the syringe or hypodermic needle or other injection means 72. The quantity and delivery of adhesive deposit 68 is such as will assure the filling of the bore 62 of the through-channel 58 with sufficient force to flow between the opposed faces 74, 76, respectively, of the aligned flexible conductor 22 and the tab 38, passing beyond the inlet 64 and outlet 66 and entering the interspace 78 defined by the tab and the flexible conductor. The deposit 68 assumes the shape shown in FIG. 3 from that shown in FIG. 2 as a result of the forces acting on the deposit during and after deposit and the natural tendency of the deposit to minimize its shape during cure effected by the UV radiation, shown schematically at 82. The adhesive crown 84 results from the quantity of adhesive resin deposit 68 used and the pressure between the faces 74, 76 that tends to squeeze the resin deposit and cause it to back up the bore 62. The deposit 68 then normally flows outward over the inlet 64 perimeter 86 onto the inlet edge margin 86 and crowns as contracting forces take over during cure.

The resulting crown 84 acts as a mechanically locking barrier to separation of the flexible conductor 22 from the tab 38 as well as an adhesive barrier. The same crowning and effect is obtained at the other tab 42 and at the load beam attachment locus 28 as well.

The invention thus provides an improved method of mounting a flexible conductor to a suspension load beam from a single side of the load beam so as to reduce handling and opportunity for error while maintaining proficiency in attachment. Mounting locations are provided for the adhesive placed so as to be accessible from the back side, or non-slider side of the suspension, through which adhesive is flowed and cured all from the same side. An assembly is provided for bonding in which the aligned flexible conductor and load beam or flexure substrate has a channel port into which flowable adhesive is forced in sufficient quantities to overflow the port inlet perimeter above and below the port forming, with cure, a crown providing mechanical as well as adhesive locking of the aligned parts together. The foregoing objects are thus met.

We claim:

1. A single-side method of mounting of a flexible conductor to a suspension comprising a load beam, including arranging said flexible conductor and load beam in their desired alignment with said flexible conductor adjacent a first side of said load beam, forcing a flowable adhesive through said load beam from a second side of said load beam and between said aligned load beam and flexible conductor and hardening said adhesive in bonding relation with said flexible conductor and said load beam.

2. The single-side flexible conductor mounting method according to claim 1, including also adhering said load beam and flexible conductor together at a plurality of attachment loci.

3. The single side flexible conductor mounting method according to claim 1, in which said suspension further comprises a flexure, and including also adhering said load beam and flexible conductor together at said load beam, and at at least two loci in said flexure.

4. The single side flexible conductor mounting method according to claim 3, in which said flexure has left and right tabs projecting beyond said load beam, and including also adhering said flexible circuit at each of said flexure tabs.

5. The product made by the method of claim 1.

6. The single side method according to claim 1, including exposing said adhesive to UV curing radiation to cure said adhesive.

7. The product made by the method of claim 6.

8. A fixed assembly of a suspension and flexible conductor, said suspension defining at a locus of attachment between said suspension and said flexible conductor a through channel having an inlet and an outlet, a mass of hardened adhesive in said channel, said adhesive extending from said channel outlet onto said flexible conductor in bonding relation and from said channel inlet.

9. The fixed assembly according to claim 8, said suspension having a series of laterally and longitudinally distributed through channels for registration with a plurality of attachment loci for said flexible conductor and said suspension.

10. The fixed assembly according to claim 8, in which said suspension comprises a load beam and a flexure, said load beam having at least one through channel in said load beam, and said flexure having at least at least two through channels.

11. The fixed assembly according to claim 10, which said flexure has left and right tabs projecting beyond said load beam, one of said two flexure through channels being located in each of said flexure tabs, said flexible conductor being fixed to said tabs and fixed to said load beam with said adhesive.

12. The fixed assembly according to claim 8, said adhesive being UV radiation cured.

* * * * *